(12) United States Patent
Grossman

(10) Patent No.: US 9,266,647 B2
(45) Date of Patent: Feb. 23, 2016

(54) REUSABLE SHOPPING BAG HAVING MULTIPLE SECONDARY USES

(71) Applicant: Waterview Innovation, LLC, McKinney, TX (US)

(72) Inventor: Eric Grossman, McKinney, TX (US)

(73) Assignee: Waterview Innovation, LLC, McKinney, TX (US)

( * ) Notice: Subject to any disclaimer, the term of this patent is extended or adjusted under 35 U.S.C. 154(b) by 10 days.

(21) Appl. No.: 13/670,912

(22) Filed: Nov. 7, 2012

(65) Prior Publication Data

US 2014/0126842 A1 May 8, 2014

Related U.S. Application Data

(60) Provisional application No. 61/692,676, filed on Aug. 23, 2012.

(51) Int. Cl.
*B65D 33/08* (2006.01)
*B65D 30/00* (2006.01)
*B65D 65/38* (2006.01)
*B65D 81/36* (2006.01)

(52) U.S. Cl.
CPC ............... *B65D 33/08* (2013.01); *B65D 31/00* (2013.01); *B65D 65/38* (2013.01); *B65D 81/36* (2013.01); *Y02W 30/807* (2015.05)

(58) Field of Classification Search
CPC ........ B65D 31/02; B65D 31/04; B65D 33/10; B65D 33/12; B65D 33/14; B65D 33/105; B65D 33/08; B65D 33/243; B65D 33/02; B65D 33/065; B65D 33/00; B65D 33/004; B65D 88/1681; A45C 9/00; A45C 9/31; A45C 4/02; B65F 2250/105; B65F 2250/108; B65F 2250/116; Y02W 30/807
USPC .............. 383/7, 10, 4, 105, 109, 107, 108, 6
See application file for complete search history.

(56) References Cited

U.S. PATENT DOCUMENTS

| 1,600,345 | A | * | 9/1926 | Littman | 383/10 |
| 1,661,143 | A | * | 2/1928 | Littman | 383/10 |
| 1,671,050 | A | * | 5/1928 | Snyder | 493/220 |
| 1,726,740 | A | * | 9/1929 | Joffe | 383/9 |
| 3,255,951 | A | * | 6/1966 | Chan | 383/10 |
| 3,462,069 | A | * | 8/1969 | Suominen | 383/10 |
| 3,468,470 | A | * | 9/1969 | Sengewald | 383/10 |

(Continued)

FOREIGN PATENT DOCUMENTS

JP  2003-165583  6/2003

OTHER PUBLICATIONS

Korean Intellectual Property Office, International Search Report and Written Opinion for PCT/US2013/056507, dated Dec. 2, 2013, 11 pages.

*Primary Examiner* — Jes F Pascua
*Assistant Examiner* — Peter Helvey
(74) *Attorney, Agent, or Firm* — Haynes & Boone, LLP

(57) ABSTRACT

The invention disclosed herein provides a shopping bag that has multiple alternative uses. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

19 Claims, 1 Drawing Sheet

(56) References Cited

U.S. PATENT DOCUMENTS

| | | | |
|---|---|---|---|
| 3,506,185 A * | 4/1970 | Christensen | 383/10 |
| 3,938,659 A * | 2/1976 | Wardwell | 206/439 |
| 4,059,222 A * | 11/1977 | Gamble | 383/10 |
| D258,204 S * | 2/1981 | Rudenschold | D9/704 |
| 4,759,639 A * | 7/1988 | DeMatteis | 383/7 |
| 4,797,010 A * | 1/1989 | Coelho | 383/109 |
| 5,065,868 A * | 11/1991 | Cornelissen et al. | 206/494 |
| 5,165,799 A | 11/1992 | Wood | |
| 5,226,858 A * | 7/1993 | Snowdon | 493/195 |
| 5,282,686 A * | 2/1994 | Haber | 383/10 |
| 5,338,118 A * | 8/1994 | DeMatteis | 383/10 |
| 5,437,406 A * | 8/1995 | Gordon et al. | 229/193 |
| 5,789,368 A * | 8/1998 | You et al. | 510/297 |
| 5,840,675 A * | 11/1998 | Yeazell | 510/417 |
| 5,851,931 A * | 12/1998 | DeRenzo et al. | 442/62 |
| 6,110,586 A * | 8/2000 | Johnson | 428/352 |
| 6,120,184 A * | 9/2000 | Laurence et al. | 383/205 |
| 6,149,007 A * | 11/2000 | Yeh et al. | 206/554 |
| 6,199,698 B1 | 3/2001 | Hetrick et al. | |
| 7,011,615 B2 * | 3/2006 | Price et al. | 493/210 |
| 8,083,409 B2 * | 12/2011 | Gelbard | 383/10 |
| 8,197,925 B2 * | 6/2012 | Sankey et al. | 428/138 |
| 8,267,580 B2 * | 9/2012 | Schneider | 383/104 |
| 2001/0029724 A1 * | 10/2001 | DeMatteis | 53/459 |
| 2002/0102032 A1 * | 8/2002 | Sturgis et al. | 383/10 |
| 2003/0236159 A1 | 12/2003 | Worthy, Jr. | |
| 2004/0028296 A1 * | 2/2004 | Meli | 383/110 |
| 2004/0074803 A1 * | 4/2004 | Otsubo et al. | 206/524.8 |
| 2005/0031228 A1 * | 2/2005 | Galomb et al. | 383/96 |
| 2005/0147774 A1 | 7/2005 | Lee | |
| 2006/0142721 A1 * | 6/2006 | Price | 604/385.02 |
| 2007/0029001 A1 * | 2/2007 | Trouilly et al. | 141/114 |
| 2007/0031067 A1 * | 2/2007 | Gebhardt | 383/7 |
| 2008/0031553 A1 * | 2/2008 | Tokita et al. | 383/113 |
| 2009/0084321 A1 * | 4/2009 | Mo | 119/161 |
| 2010/0021088 A1 * | 1/2010 | Wilfong, Jr. | 383/23 |
| 2010/0025456 A1 * | 2/2010 | McCann | 229/117.06 |
| 2010/0028575 A1 | 2/2010 | Vanhamel | |
| 2010/0172600 A1 * | 7/2010 | Sherrill et al. | 383/10 |
| 2010/0187135 A1 * | 7/2010 | Broering et al. | 206/204 |
| 2010/0189380 A1 | 7/2010 | Sargin et al. | |
| 2010/0316309 A1 | 12/2010 | Wilfong | |
| 2011/0092120 A1 * | 4/2011 | Todt et al. | 442/149 |
| 2011/0162989 A1 * | 7/2011 | Ducker et al. | 206/389 |
| 2012/0230611 A1 * | 9/2012 | Ebner et al. | 383/7 |
| 2012/0294551 A1 * | 11/2012 | Ford | 383/35 |

* cited by examiner

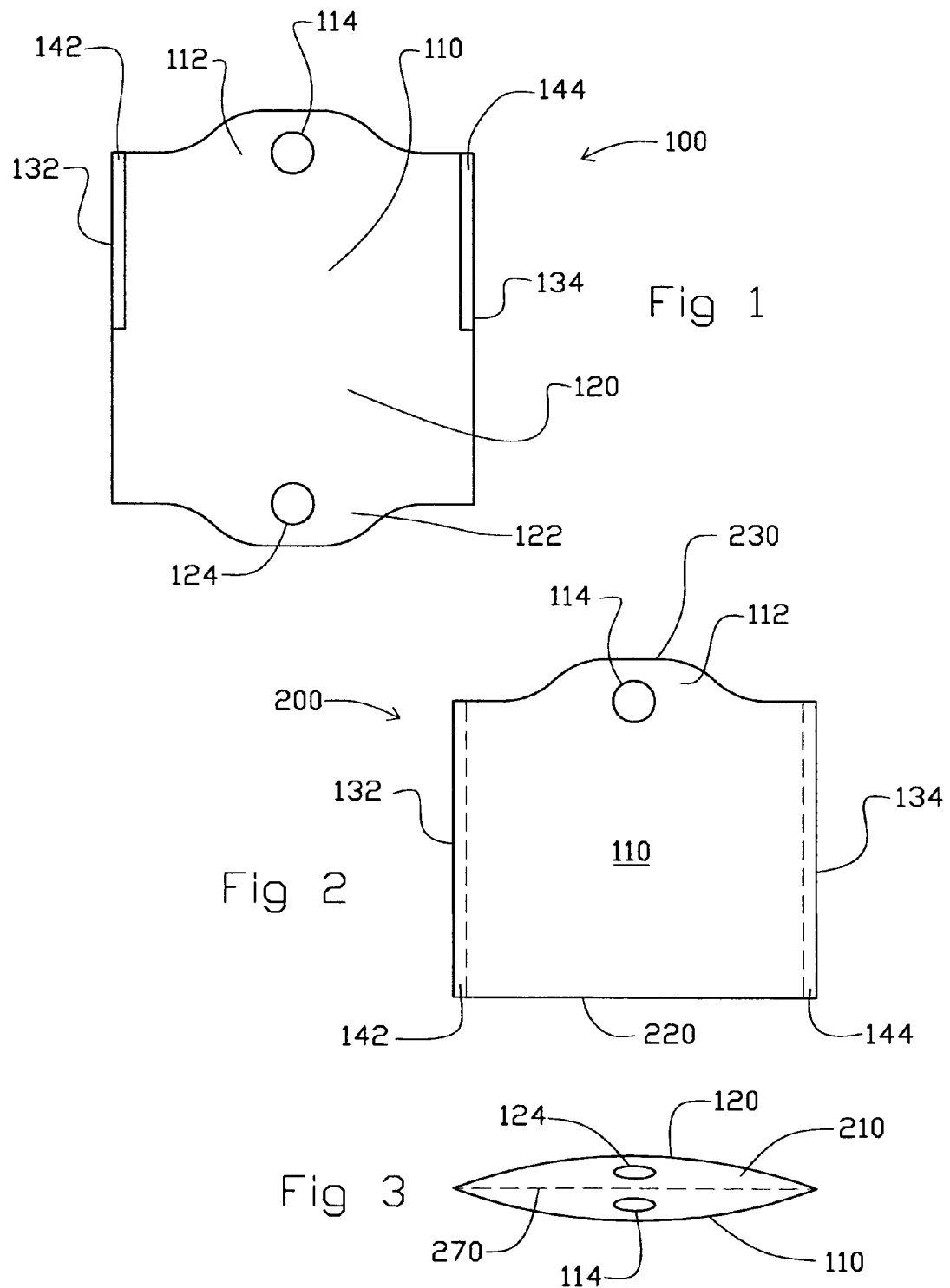

REUSABLE SHOPPING BAG HAVING MULTIPLE SECONDARY USES

CLAIM OF PRIORITY

This patent application claims priority from U.S. Provisional Patent Application No. 61/692,676 entitled MULTI-PURPOSE BAG which was filed on Aug. 23, 2012, and names common inventor Grossman.

TECHNICAL FIELD OF THE INVENTION

The present invention relates to retail shopping bags, more particularly, the invention relates to multi-purpose retail shopping bags.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Retailers and those in the recycling-movement have long-struggled to find productive alternative/secondary uses for used shopping bags. For example, some bags have alternative uses such as lining small trashcans (indeed, containers are made to be used with plastic shopping bags). But, these alternative uses are certainly not optimal, often just accumulate in a drawer/bag or other container, and because they can be both eyesores when blowing around lawns as well as dangerous to birds and other animals, plastic grocery bags are targeted for banning by environmental groups. The result is that in many municipalities, various types of shopping bags are banned by law. Other bags have been designed for specific secondary purposes, such bags that unfold for use as a napkin or a table cloth. However, these single use-case bags are unpractical; after all, very few consumers go on a picnic or set a table for every shopping bag they take home.

Recently, cloth reusable bags have gained popularity. However, studies show that these reusable bags harbor dangerous bacteria after just a few uses. The result has been that there are no compelling alternatives that are safe, environmentally conscious, and affordable. The present invention provides an apparatus that overcomes these disadvantages and provides a new variety of ways to reuse a shopping bag.

BRIEF DESCRIPTION OF THE DRAWINGS AND TABLE

Various aspects of the invention, as well as an embodiment, are better understood by reference to the following detailed description. To better understand the invention, the detailed description should be read in conjunction with the drawings, in which:

FIG. 1 shows an unfolded view of the inventive bag;
FIG. 2 illustrates the bag as manufactured; and
FIG. 3 is a top-down view of the bag.

DETAILED DESCRIPTION OF THE INVENTION

Interpretation Considerations

When reading this section (which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "attaching" may be done by hook-and-loop attachment (such as Velcro®), snaps, hooks, belts, etc., and so a use of the word attaching invokes all methods of attachment known in and anticipated by the art, and all other modes of that word and similar words).

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

It should be noted in the following discussion that acts with like names are performed in like manners, unless otherwise stated. Of course, the foregoing discussions and definitions are provided for clarification purposes and are not limiting. Words and phrases are to be given their ordinary plain meaning unless indicated otherwise. The numerous innovative teachings of present application are described with particular reference to presently preferred embodiments.

Functional Description of the Invention

In one embodiment, the invention is a retail carrier or grocery tote bag made with a rag material. It is not only a reusable item, but a multi-use reusable bag. For example, it could be reused as a bag until it reaches its usable life. It could then can be rinsed and or sanitized and used for a rag. In one embodiment, the material the body of the bag is made of is chosen to be useful for many household chores including wiping down counters, washing windows or even washing/drying off a car.

Once brought home from the store the bag can be stored in a drawer or cabinet and used whenever normally a rag would be needed to clean up a spill, etc. Because the bags are reused in many ways, multiple times, less trash enters the environment, and the need for plastic bags, which often become trash in trees and can even kill birds and fish. Additionally, a bag may have a logo printed thereon, and the logo may be printed with ink that expresses itself when the bag material becomes wet, or reaches a certain temperature (hot or cold).

DESCRIPTION OF THE DRAWINGS

The invention, a reusable, multi-purpose bag apparatus, is described in simultaneous reference to FIGS. 1-3, in which FIG. 1 shows an unfolded view of the inventive bag 200, FIG. 2 illustrates the bag 200, and FIG. 3 is a top-down view of the bag 200.

The bag 200 is preferably comprised of a generally rectangular body 100 having a polyester and wood pulp combination non-woven fabric. However, many non-woven fabrics are usable to achieve the objectives of the invention. For example a list of exemplary non-woven fabrics is listed in Table 1.

TABLE 1

Alternative Non-Woven Fabrics

Spun-Lace Material
Polypropylene
Polyethylene
Polylactic Acid
Polyester
Cotton
Wood Pulp
Paper Alternatively, the rag material is made with a paper-like wood fiber pulp and a small amount of polyester (or other polymer) fiber material laminated together via water lace bonding. In an alternative embodiment, the pulp material is a synthetic pulp. In one embodiment, the ragbag material can be 30 g heavier depending on the strength requirement of the final bag to be produced. For the medium weight 60 Gsm material, it is preferred to use approximately 35 G wood fiber pup+25 G of Polyester. Water pressure helps to create strength in the this process by bonding shorter wood fibers to the longer fibers of the polymer material. Preferably, the material absorbency potential is approximately about five times the weight of the material, so 60 grams ragbag material generally can absorb at least 300 grams of water. The percentage of wood fiber influences absorbability, meaning that liquids usually absorb better into "cloth" with more wood material in it. The desired strength will ultimately determine the ratio of paper (or other pulp) to polymer.

The body 100 is formed to define the bag 200. The bag 200 has a top 230 that opens to define a mouth 210, and a closed bottom 220 formed by a fold in the body 100. When folded, the bag 200 has a generally rectangular first panel 110 and a generally rectangular second panel 120, each panel 110, 120 having a top area 112, 122 located proximate to the top 230 of the bag 200 and each panel 110, 120 having a first side edge 132 and second side edge 134. The top area 112 of the first panel 110 and the top area 122 of the second panel 120 have holes 114, 124 therein that are usable as handles. Alternative handle embodiments include die-cut handles, or heavy strips of material that are looped and then utilize a Polymer with EVA to "weld" the ends of the strips to the inside of the bag, for example. Of course, upon reading this disclosure, alternative methods of creating bag handles will be readily apparent to those of ordinary skill in the art without departing from the invention.

The first panel 110 is coupled to the second panel 120 at the first panel edge 132 and the second panel edge 134 via seals comprising Ethyl Vinyl Acetate (EVA). Shown in FIG. 1 are strips 142, 144 that may alternatively be actual strips of a polymer containing a high concentration of EVA. The preferred process uses strips of Polymer with a high EVA concentration and, by using heat, melts the Polymer strips 142, 144 between the first panel 110 and the second panel 120.

Alternative methods of attaching/sealing the panel edges 132, 134 include using a sufficient quantity of EVA to saturate each section (defined by are area covered by the strips 142, 144) of each panel 110, 120 to be attached, and using hot melt glue, for example. Of course, other methods and systems for attaching the panels 110, 120 are readily apparent to those of ordinary skill in the art upon reading the present disclosure, and are incorporated in the scope of the invention. Additionally, bags may be created having a third seam such that a large roll of material formed into a "tube" and then cut in the middle to create two bags at a time. This third seam exists near the bottom of each bag where the tube is formed.

In one embodiment special inks are used to print on the bag 200. For example, some inks are sensitive to temperature (either hot or cold), while others are sensitive to moisture. Accordingly, special advertising/messaging effects can be generated via the bags. For example, a promotional message could be expressed when a chilled beverage is placed in the bag 200 (i.e. "your beverage is ice cold"), which changes to a second message when the beverage is removed from the bag and it warms to a pre-known temperature (i.e. "go out and buy brand X"). Additionally, the bag may express a third message when the bag is disassembled to be used as a rag and wetted (i.e. "wouldn't you rather be drinking X now?").

Though the invention has been described with respect to specific preferred embodiments, many variations and modifications will become apparent to those skilled in the art upon reading the present application. Specifically, the invention may be altered in ways readily apparent to those of ordinary skill in the art upon reading the present disclosure. It is therefore the intention that the appended claims and their equivalents be interpreted as broadly as possible in view of the prior art to include all such variations and modifications.

I claim:

1. An apparatus, comprising:
 a generally rectangular body formed of a non-woven fabric comprising polyester and wood pulp fiber, the non-woven fabric having an absorbency potential of at least twice a weight of the fabric, the body being formed to define a bag, the bag having:
 a top that opens to define a mouth, and a closed bottom;
 at least a generally rectangular first panel and a generally rectangular second panel, each panel having a top area located proximate to the top of the bag, wherein each of the panels is formed of the non-woven fabric, the non-woven fabric defining both interior and exterior walls of the bag;

the first panel being coupled to the second panel at at least one panel edge; and the first panel being attached to the second panel via a seal.

2. The apparatus of claim 1 wherein the seal is a heat-seal.

3. The apparatus of claim 1 wherein the seal is created by saturating each edge to be sealed with Ethyl Vinyl Acetate.

4. The apparatus of claim 1 wherein a ratio of polymer fibers to wood pulp fibers in the non-woven fabric is approximately 5:7.

5. The apparatus of claim 1 further comprising a handle coupled to the body via a seal comprising a strip of polymer comprising Ethyl Vinyl Acetate positioned between the handle and the non-woven fabric.

6. The apparatus of claim 1, further comprising a discrete polymer strip positioned between the first panel and the second panel, wherein the seal comprises the polymer strip.

7. The apparatus of claim 6, wherein the polymer strip comprises Ethyl Vinyl Acetate.

8. The apparatus of claim 1 wherein the non-woven fabric is spun lace material.

9. The apparatus of claim 8 wherein the non-woven fabric comprises polylactic acid.

10. An apparatus, comprising:
    a generally rectangular body consisting of non-woven fabric having an absorbency potential of at least twice of a weight of the fabric, the body being formed to define a bag, the bag having:
        a top that opens to define a mouth, and a closed bottom;
        at least a generally rectangular first panel and a generally rectangular second panel, each panel having a top area located proximate to the top of the bag, wherein each panel is formed of the non-woven fabric;
        the first panel being coupled to the second panel at at least one panel edge; and
        the first panel being attached to the second panel via a seal, wherein the seal is created via a polymer strip.

11. The apparatus of claim 10 wherein the seal is created via a polymer strip comprising Ethyl Vinyl Acetate.

12. The apparatus of claim 10, wherein a ratio of polymer fibers to wood pulp fibers in the non-woven material is approximately 5:7.

13. The apparatus of claim 10 wherein the seal comprises a melt-bonded, discrete polymer strip.

14. The apparatus of claim 10 wherein the non-woven fabric is spun lace material.

15. The apparatus of claim 14 wherein the non-woven fabric comprises polylactic acid.

16. A reusable, multi-purpose bag apparatus, comprising:
    a generally rectangular body comprising a polyester and wood pulp combination non-woven fabric, the non-woven fabric having an absorbency potential of at least twice a weight of the fabric, the body being formed to define a bag, the bag having:
        a top that opens to define a mouth, and a closed bottom formed by a fold in the body;
        at least a generally rectangular first panel of the non-woven absorbent fabric and a generally rectangular second panel of the non-woven fabric, each panel having a top area located proximate to the top of the bag and each panel having a first side edge and second side edge;
        the top area of the first panel and the top area of the second panel having holes therein that are usable as handles; and
        at least one discrete strip of Ethyl Vinyl Acetate positioned between the first panel and the second panel, wherein the first panel is coupled to the second panel via a seal comprising the at least one discrete strip of Ethyl Vinyl Acetate, wherein the non-woven fabric of the first panel and the second panel define interior walls of the bag, wherein the non-woven fabric of the first panel and the second panel define exterior walls of the bag, and wherein the holes extend from the exterior wall to the interior wall.

17. The apparatus of claim 16 wherein a ratio of polymer fibers to wood pulp fibers in the non-woven fabric is approximately 5:7.

18. The apparatus of claim 16 wherein the seal comprises the at least one discrete strip of Ethyl Vinyl Acetate melt-bonded to the first panel and the second panel.

19. The apparatus of claim 16 wherein the non-woven fabric comprises water lace bonded material.

\* \* \* \* \*